United States Patent
Blencowe et al.

(10) Patent No.: US 10,333,993 B2
(45) Date of Patent: *Jun. 25, 2019

(54) SESSION INITIATION PROTOCOL MESSAGE PROCESSING

(71) Applicant: INTERNATIONAL BUSINESS MACHINES CORPORATION, Armonk, NY (US)

(72) Inventors: Paul D. Blencowe, Hursley (GB); Richard R. Large, Hursley (GB); Philip Noel, Hursley (GB); Shahab Rostami, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/417,405

(22) Filed: Jan. 27, 2017

(65) Prior Publication Data

US 2017/0155689 A1 Jun. 1, 2017

Related U.S. Application Data

(63) Continuation of application No. 15/353,083, filed on Nov. 16, 2016.

(30) Foreign Application Priority Data

Nov. 26, 2015 (GB) .................................. 1520879.6

(51) Int. Cl.
*H04L 29/06* (2006.01)
*H04M 3/493* (2006.01)
(Continued)

(52) U.S. Cl.
CPC .......... *H04L 65/1006* (2013.01); *H04L 45/74* (2013.01); *H04L 51/28* (2013.01);
(Continued)

(58) Field of Classification Search
CPC combination set(s) only.
See application file for complete search history.

(56) References Cited

U.S. PATENT DOCUMENTS 6,260,059 B1 * 7/2001 Ueno ..................... G06N 5/043
707/999.01
7,522,581 B2 4/2009 Acharya et al.
(Continued)

OTHER PUBLICATIONS

Barnes et al., "An Extension to the Session Initiation Protocol (SIP) for Request History Information", The Internet Society, https://tools.ieff.org.html/rfc7044, Nov. 2005 (44 pages).
(Continued)

*Primary Examiner* — Yemane Mesfin
*Assistant Examiner* — Henry Baron
(74) *Attorney, Agent, or Firm* — Steven Chiu; Matthew M. Hulihan; Heslin Rothenberg Farley & Mesiti PC

(57) ABSTRACT

A process is provided which facilitates providing information to a user in an Internet telephony environment. A Session Initiation Protocol (SIP) message including a SIP message header is received from a user. A string pattern matching operation identifies a stored regular expression pattern which matches a character string in a user part of the SIP message header. One portion of the character string identifies an application mapped to the stored pattern. A further portion of the character string identifies one or more variables for use by the application. The application identifies information by applying the value of the one or more variables and communicates this to the user. The application may be on an Interactive Voice Response (IVR) system.

18 Claims, 4 Drawing Sheets

(51) Int. Cl.
  *H04M 7/00*    (2006.01)
  *H04L 12/741*  (2013.01)
  *H04L 12/58*   (2006.01)
  *H04L 29/08*   (2006.01)
  *H04L 29/12*   (2006.01)

(52) U.S. Cl.
  CPC ........ *H04L 61/106* (2013.01); *H04L 61/3085* (2013.01); *H04L 67/147* (2013.01); *H04L 69/161* (2013.01); *H04L 69/22* (2013.01); *H04M 3/493* (2013.01); *H04M 7/006* (2013.01); *H04L 65/1069* (2013.01); *H04M 2203/357* (2013.01)

(56) References Cited

U.S. PATENT DOCUMENTS

| | | |
|---|---|---|
| 7,978,686 B2 | 7/2011 | Goyal et al. |
| 8,214,640 B2 * | 7/2012 | Das .......................... H04L 9/00 713/153 |
| 8,229,099 B2 | 7/2012 | LaCroix et al. |
| 9,042,372 B2 | 5/2015 | Zhakov et al. |
| 2010/0325275 A1 | 12/2010 | Van Elburg et al. |
| 2014/0270108 A1 | 9/2014 | Riahi et al. |
| 2014/0280991 A1 | 9/2014 | Lederman et al. |

OTHER PUBLICATIONS

Blencowe et al., "Sission Initiation Protocol Message Processing", U.S. Appl. No. 15/353,083, filed Nov. 16, 2016 (33 pages).
Blencowe et al., "List of IBM Patents and/or Patent Applications Treated as Related", U.S. Appl. No. 15/417,405, filed Jan. 27, 2017, dated Jan. 27, 2017 (2 pages).

* cited by examiner

SESSION INITIATION PROTOCOL MESSAGE PROCESSING

BACKGROUND

Internet telephony is a term used for a methodology and a set of technologies which deliver voice and multimedia telephony services over the public Internet and other networks using the Internet Protocol (IP). Other terms used include Voice over IP (VoIP) and IP telephony. Telephone calls and multimedia sessions are communicated over the underlying Internet communication protocols between telephones and other devices comprising Internet telephony application software. A term often used for an Internet telephony application is a softphone. A softphone may be used on a telephone device such as a mobile phone or cell phone, or on a fixed or portable computing device such as a tablet computer.

Interactive Voice Response (IVR) is a technology which allows human interaction with computers comprising an IVR application. The computer comprising the application is usually termed an IVR system. An IVR system accepts telephone calls from callers and can play a series of voice prompts to callers. It also have the capability to gather data from callers either through button presses or voice recognition. Many IVR systems can host a variety of applications providing different services. Typically such applications are accessible by dialing a telephone number associated with the application.

Many IVR systems now interact over Internet telephony networks. Applications in such IVR systems are often written using the VoiceXML (VXML) standard, to write IVR system voice dialogs, for example. VXML is based on XML and may interact with a voice browser of an IVR system in a way analogous to the way a textual Web browser interacts with an HTML document. A protocol frequently used for Internet telephony communication sessions is Session Initiation Protocol (SIP) which is described in Internet Engineering Task Force (IETF) Request for Comments (RFC) number rfc3261, accessible here: http://tools.ietf.org/html/rfc3261.

SUMMARY

According to an embodiment of the present invention, a computer-implemented method is provided for communication in an Internet telephony environment. The method includes inserting in the user part of a Session Initiation Protocol, SIP, header of a SIP message a character string matchable to, by a string pattern matching operation, a stored regular expression pattern. One portion of the character string identifies an entity mapped to the stored pattern, and a further portion of the character string identifies one or more variables applicable to the entity. The values of the one or more variables are usable by a receiver of the message to process information relating to the entity. The method further includes communicating the message to a message receiver.

According to another embodiment of the present invention, an Internet telephony system is provided for communicating information in a Session Initiation Protocol, SIP. The Internet telephony system includes a memory, and a processor communicatively coupled to the memory. The Internet telephony system performs a method, which includes inserting in the user part of the Session Initiation Protocol, SIP, header of a SIP message a character string matachable to, by a string pattern matching operation, a stored regular expression pattern. One portion of the character string identifies an entity mapped to the stored pattern, and a further portion of the character string identifies one or more variables applicable to the entity. The values of the one or more variables are usable by a receiver of the message to process information relating to the entity. The method performed by the system further includes communicating the message to a message receiver.

According to a further embodiment, a computer program product for communicating information in an Internet telephony environment is provided. The computer program product includes a computer readable storage medium having a computer readable program code stored therein. The computer readable program, when executing on a computing device, causes the computing device to insert in the user part of a Session Initiation Protocol, SIP, header of a SIP message a character string matchable to, by a string pattern matching operation, a stored regular expression pattern. One portion of the character string identifies an entity mapped to the stored pattern, and a further portion of the character string identifies one or more variables applicable to the entity. The values of the one or more variables are useable by a receiver of the message to process information relating to the entity, and in operation, the message is communicated to a message receiver.

Additional features and advantages are realized through the techniques of the present invention. Other embodiments and aspects of the invention are described in detail herein and are considered a part of the claimed invention.

BRIEF DESCRIPTION OF THE DRAWINGS

Embodiments of the present invention will now be described, by way of example only, with reference to the drawings, in which.

DETAILED DESCRIPTION

Figure 1:
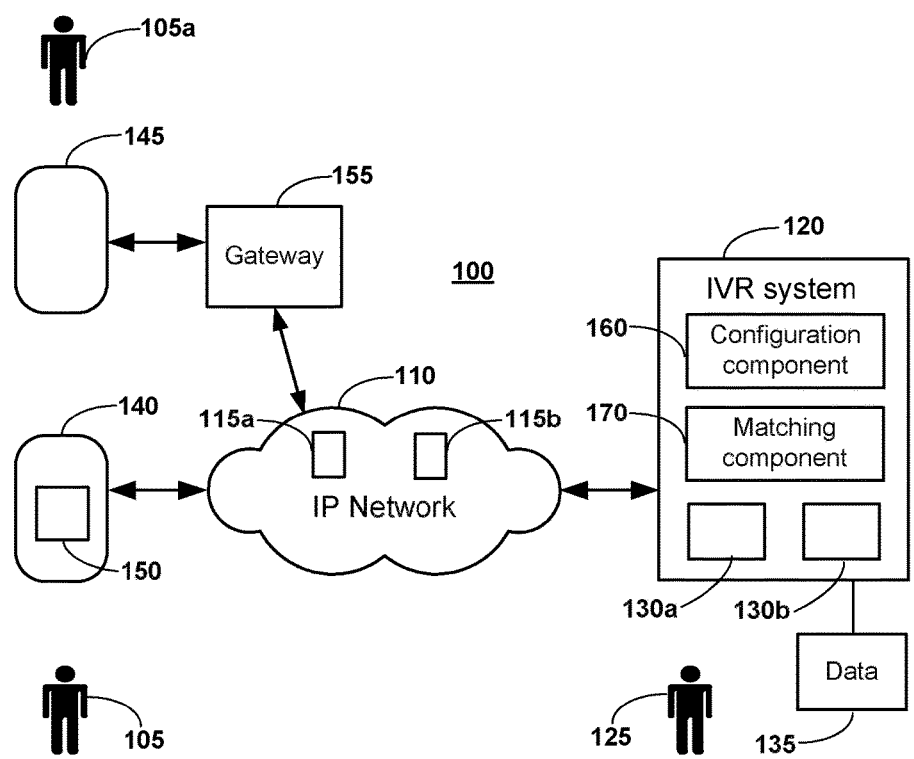
FIG. 1 illustrates a system within which one or more aspects of the present invention may be deployed.

Interactive Voice Response (IVR) systems map incoming phone calls to applications by evaluating the number that was dialed by the caller. Conventional telephone numbers were usually made up of only the digits from 0-9, and so to map a number to an application, the system administrator would specify a number or a number range (e.g. 100-150). Where an IVR system includes an Internet Telephony system, it may be using Session Initiation Protocol (SIP) as described in rfc3261. SIP does not have a restriction of using only numbers.

In a SIP communication environment, an end system is termed a user agent. A user agent client (UAC) initiates requests, and a user agent server (UAS) responds to them. A UAC may be, for example, an application running on a computing device such as a personal computer, a laptop, a tablet, or a mobile phone or cell phone. Such an application may be called a softphone. The UAC may also be a dedicated device. A UAS may be an IVR system, for example.

SIP communications use SIP messages. A SIP message may be a request or a response. A SIP message may include three parts. For a request, there is a Request-Line, zero or more message-headers, and an optional message body. Some headers include a Uniform Resource Identifier (URI) identifying the source and destination and including a character string. When communicating with an IVR system, the URI of the SIP header may include a variety of textual characters and is not restricted to using numbers. Embodiments of the invention provide methods for communicating with an IVR system using SIP in a flexible manner.

It is desirable for an IVR application to be accessible through multiple user entered character strings. One current solution on most systems is to simply map the exact user string to an application. For example, the IVR administrator may configure the application "weather" to be accessible by calling using a URI including "weathercall0001". If they want another user string (e.g. "weathercall0002") to access the same application, they have to specify the application again using the alternative user string. Although not much of a problem for just two strings, if this pattern were to be repeated 1000 times it would be time consuming.

Another solution is to ignore letter strings entirely and just accept calls dialed to a user string including the numerical digits 0-9 and then use existing number range mapping. This rejects all calls containing letters. The system administrator then specifies their number ranges as before, by selecting an application such as "weather" and specifying a number range (e.g. 12300-12400) which would allow any call within that range to reach the weather application. This is inflexible and is also fairly ambiguous to the user in that it is not clear exactly what application they are calling into as they just dial numbers rather than a text string representing the type of application they are calling. From a user's perspective, dialing "12345" could reach any application, and one mistake in the number dialed could lead them to a completely different application.

Neither solution fully exploits the flexibility allowed by using a user character string, as SIP does, instead of a telephone number. The IBM® Web Sphere® Voice Response IVR product has the concept of "NumToApp" mappings which allow system administrators to map an application to a number. This allows wildcards but only works with numbers.

Embodiments of the invention use a string pattern matching operation to match a user character string in a URI to an application in an IVR system, or in any other system which uses SIP header information to receive user information. Embodiments use a regular expression (abbreviated as regex) for string pattern matching. The regular expression is a sequence of characters which defines the search pattern. Several standards for regular expressions exist. One example standard is that provided by IEEE POSIX Extended Regular Expressions as detailed here: http://pubs.opengroup.org/onlinepubs/009696899/basedefs/xbd_chap09.html.

It will be apparent that this is provided by way of example only. Other standards for regular expressions, and indeed other string pattern matching systems using regular expressions, may be used without departing from the scope of the invention. When discussing regular expressions, the distinction is sometimes made between regular characters and metacharacters, which are characters with special meanings. In the following, the term character will be used to cover both regular characters and metacharacters.

FIG. 1 illustrates a system according to embodiments of the present invention. System 100 includes Internet Protocol (IP) network 110, which may include the public Internet. IVR system 120 connects to IP network 110. IVR system 120 includes voice response applications, for example applications 130a, 130b. IVR system 120 further includes data 135 accessible by applications, for example applications 130a, 130b. Although illustrated as residing in IVR system 120, applications, for example applications 130a and 130b, may reside on any suitable computing device in communication with IVR 120. Telephony device 140 includes a fixed or portable computing device including an Internet telephony application, for example softphone 150. Alternatively telephony device 140 may include a dedicated Internet telephony device including Internet telephony function 150. For brevity the term softphone 150 will be used hereafter to refer to the initiator including the user agent client, UAC.

To make a call to IVR 120, user 105 initiates an Internet telephony call to IVR system 120 using softphone 150. Softphone 150 includes functionality supporting SIP. Softphone 150 issues an INVITE SIP request message which may include elements as detailed in rfc3261. For an INVITE SIP request, the "To" header includes the address to which the message is to be sent, and the "From" header includes the address of the user. The "To" header includes a URI including an identifier of the resource called, for example a number or name, to be resolved at the address following the @ sign of the URI. The "From" header includes a URI identifying the initiating user. User 105 may enter the identifier of the resource or application called as a number or name on the softphone and it may be termed the user part of the URI in the "To" header. The softphone may then use it to complete the address. Alternatively the user 105 may enter the complete URI.

For example, if user 105 enters "1234" on softphone 150, the following might be the completed INVITE SIP request:

```
INVITE sip:1234@abcdefg.com SIP/2.0
Via: SIP/2.0/UDP pc20.hijklmn.com;branch=z9hG4bK776asdh
Max-Forwards: 70
To: <sip:1234@abcdefg.com>
From: <sip:alice@hijklmn.com>;tag=1928301774
Call-ID: a84b4c76e66710@pc20.hijklmn.com
CSeq: 314159 INVITE
Contact: <sip:alice@pc20.hijklmn.com>
Content-Type: application/sdp
Content-Length: 142
```

Softphone 150 sends a SIP request to, for example, application 130a of IVR system 120. IVR system 120 sends the response of application 130a to softphone 150.

IVR system 120 further includes configuration component 160. Configuration component 160 provides configuration functionality to an IVR system administrator 125 to configure applications of IVR system 120, for example applications 130a and 130b. Configuration component 160 may include a configuration application including a suitable user interface for administrator interaction. Administrator 125 of IVR system 120 uses configuration component 160 to enter configuration settings for accessing an application, for example application 130a.

In an embodiment, administrator 125 specifies configuration settings including a string pattern matching expression. In an embodiment, administrator 125 specifies a regular expression pattern, or regex pattern, to map a character string to an application. In an embodiment, the character string includes the user part of the "To" header of the SIP request. In an embodiment, IVR system 120 includes matching component 170. Matching component 170 includes functionality to store specified regex patterns and the application to which they map. In the example below, administrator 125 specifies a dialed number range 1000-1999 to go to an application "weather":

```
application = "weather"
user = "1[0-9]{3}"
```

The regex "1[0-9]{3}" will match the number 1 followed by exactly three digits between 1 and 9. For example, user 105 uses softphone 150 to dial the number "1234" which will call the "weather" application. Softphone 150 inserts the string "1234" into the "To:" user field of a SIP message header. Matching component 170 of IVR system 120 uses the regex expression to match the string 1234 and map the message to the "weather" application.

Administrator 125 may alternatively specify any user string. For example, a text string may be used. Administrator 125 may want any softphone text string commencing "weather" to match. User 105 dialing "weatherWinchester" or "weatherLondon", for example, would call the "weather" application. Administrator 125 would in this case specify:

```
application = "weather"
user = "weather.*"
```

Administrator 125 may specify a further string to match to the "weather" application, for example so that "forecast" will also call the "weather" application:

```
application = "weather"
user = "forecast.*"
```

In an embodiment, matching component 170 includes an ordered array of regular expression to application mappings. When IVR 120 receives a call including a SIP request including a SIP header, matching component 170 runs a regex match check of the character string in the "To" header against each application's regex pattern. IVR system 120 launches the first application whose regex matches the character string. If matching component 170 does not find a match, the call is rejected by IVR system 120.

For example, a programmer may implement the embodiment as follows. It will be apparent to the skilled person that this is for illustration only, and that other ways of implementing the embodiment may be envisaged without departing from the scope of the invention. Most modern programming languages already include a regex library. The programmer creates a class representing an application mapping:

```
class AppMapping
    String pattern
    PhoneApplication applicationToRun
    boolean matches (String dialedString) {
        if (Regex.matches(pattern, dialedString))
            return true
        else
            return false
    }
}
```

They then store an array of these AppMapping classes, and loop through the array until an application matches:

```
AppMapping[ ] mappings
AppMapping getAppMapping (String dialedString) {
    for each AppMapping mapping in mappings {
        if (mapping.matches(dialedString))
            return mapping
    }
    return defaultAppMapping
}
```

At any point, administrator 125 can create new regex to application mappings to add entry points to IVR applications. Specifying of regular expressions allows administrator 125 to specify a very wide range of patterns, both inclusive and exclusive. This potentially provides user 105 with many options for calling a given application. If a regular expression specified for an application matches the entered string, IVR 120 calls the application.

Embodiments use string pattern matching, particularly regular expressions, to map matched character strings in the user part of the "To" header of the SIP request to applications in IVR system 120. Embodiments extend this so as to capture further information from the user part of SIP headers, for example the "To" header.

Regular expressions may not only match against application identifiers in patterns, but are also flexible enough to capture variables from these patterns. In an embodiment, administrator 125 may specify a pattern that captures variables, for example:

```
application = "weather"
user = "weather_(.*)"
```

The information in parentheses is the information captured from the user part of the "To" header of a message and assigned to a first variable of the "weather" application. For example, user 105 enters "weather_london". The underscore here serves to delimit the elements of the user part. The first portion before the underscore identifies the application mapped to, the application "weather" in this case. It will be apparent that other means of delimiting are possible without departing from the scope of the invention. The regular expression standard used, or other string pattern matching standard, will provide suitable expressions to control the information contained.

As previously described, matching component 170 identifies application "weather". Matching component 170 of IVR 120 parses the string after the underscore, in this case "london", identifies it as a variable identifying a place, and passes it to the "weather" application. The "weather" application uses the variable to search its information for the value of variable "london". It than identifies the weather forecast for London and passes this to communication functionality of IVR 120 which communicates it to the calling user.

Embodiments provide further extensions to this, allowing more than one variable to be specified. For example, administrator 125 may specify the following pattern:

```
application = "weather"
user = "weather_([^_]*)_([^_]*)"
```

Matching component 170 may now read up to two variables after the string identifying application "weather". For example, user 105 enters "weather_london_tomorrow". As before, matching component 170 identifies application "weather". Matching component 170 of IVR 120 parses the strings after the first and second underscores, in this case "london" and "tomorrow". It identifies these as a first variable identifying a place, and a second variable identifying a time. It passes these to the "weather" application. The weather application uses the variables to search its information, for example from data 135, for the values of variable "london" qualified by variable "tomorrow". It than identifies tomorrow's weather forecast for London and passes this to communication functionality of IVR 120 which communicates it to the calling user. It will be apparent that although illustrated as separate from IVR system 120, data 135 may reside in IVR system 120.

It will be apparent that administrator 125 may specify patterns including support for further variables. It will also be apparent that administrator 125 may specify patterns including support for other qualifying information in the user part of headers including URIs, for example the "To" field. Embodiments may include IVR system 120 having further functionality to capture a range of user information from the user part of header URIs by means of regular expressions. IVR system 120 may then apply this information to further tailor the response to user 105. It will further be apparent that the regular expression used may vary while producing a similar result in use. It will also be apparent that different implementations of regular expressions exist and that the form of regular expression used in patterns may vary dependent upon the standard or other regular expression reference document being used.

Embodiments thereby provide a method for a user to control the information they wish their softphone to send to an IVR by explicitly defining the user part of the "To" header. The user may call specific variable data from an application without first passing through further prompts from the IVR. Embodiments do not require modifications to SIP as defined in rfc3261. Using regular expressions allows the use of a very powerful, well documented, open standard with a common pattern matching language.

The above embodiments use the user part of the URI in the "To" header. Other embodiments may use the user part of URIs in other headers in a similar manner to communicate information which may be extracted by using a string pattern matching operation, particularly using regular expressions. Other headers may be used, for example, where the original call was initiated as a traditional telephone call, for example via a TDM digital network, and enters the IP network via a gateway.

In an embodiment, the URI in the "From" header is used. In FIG. 1, in an example call, user 105a makes a telephone call from their telephone 145, which has telephone number 5678, to IVR system 120 identified by dialed telephone number 1234. Gateway device 155 including, for example, a server of a telephony provider of user 105a, receives the call. Gateway device 155 performs a lookup of user 5678 (for example using automatic number identification, ANI) and identifies user 105a. The lookup resolves user 105a as a hard-of-hearing, premium user having customer identifier a1b2.

Gateway device 155 now converts the call to a SIP request for onward passage to IP network 110 and so is the SIP UAC. It will be the recipient of the SIP response, and so perform the opposite conversion to pass the response to user 105a. The SIP request has the following "From" header (where "gateway" is the IP address of gateway device 155):
From: <sip:a1b2_hardhearing_premium@gateway>

The SIP request has the following "To" header (where proxy1 is the IP address of a first proxy server, for example server 115a, including the first destination for the request):
To: <sip:1234@proxy1>

The proxy server proxy1 includes string pattern matching, particularly regular expression, functionality to parse the user part of the "From" header. It would recognize "premium" as requiring routing to provide a premium service, for example routing via less busy servers. Each proxy, for example servers 115a and 115b, through which the SIP request passes performs similar operations and adds their own headers. Again, these headers may also include user parts accessible using string pattern matching, particularly using regular expressions, as above.

The call reaches IVR system 120. Matching component 170 parses the user part of the "From" header and identifies "hardhearing" as requiring the playing of all call prompts to user 105a at a higher volume than normal.

It will be apparent to the skilled person that any user part of a URI in a SIP header may be parsed in a similar way using string pattern matching, so as to extract information regarding aspects of call handling. The user part may identify a call originator, and information about their specific requirements or account details. It will be apparent to the skilled person that any entity may be subject to providing information in a SIP header in this way. So an originating communication source other than a calling user may be an entity which is the subject of a SIP header as described above. Similarly, embodiments are not limited to the "To" and "From" headers. Other headers which include a URI with a user part may be employed for a variety of purposes without departing from the scope of the invention. Embodiments provide an extremely flexible way of using the standard Session Initiation Protocol without introducing proprietary headers.

Figure 2:
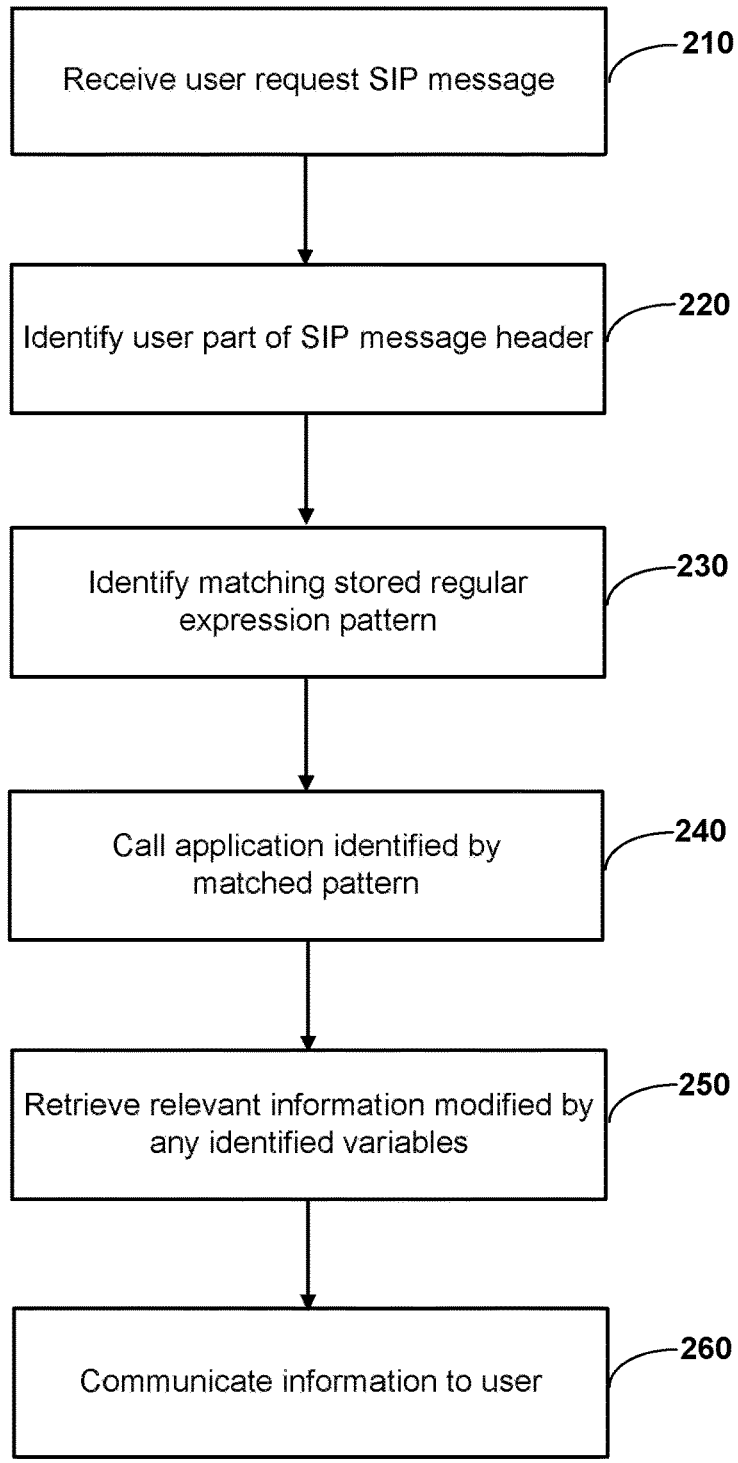
FIG. 2 illustrates a method according to one or more aspects of the present invention.

FIG. 2 is a flow chart illustrating a method according to an embodiment of the invention. Referring collectively to FIGS. 1 & 2, at step 210, a receiving server or system, for example IVR system 120, receives a SIP request from a requester, for example softphone 150 of device 140 of user 105. Alternatively, IVR system 120 receives a SIP request created by gateway 155 from a call made by user 105a. At step 220, matching component 170 of IVR system 120 identifies the character string including the user part of a URI in a SIP message header. In embodiments the user part is in a URI in the "To" header. At step 230, matching component 170 identifies a stored regular expression pattern which matches the character string of the user part.

At step 240, matching component 170 calls the application identified as mapped to the matched pattern, for example application 130a or 130b. At step 250, the identified application retrieves its current information. If the pattern matching operation identifies variables in the user part additional to the application identifier, the identified application processes the variables to modify the information retrieved to conform to the values of the variables. At step 260, receiving system, for example IVR system 120, communicates this information to softphone 150 of user 105. IVR system 170 may use any conventional techniques for communication. These may include, for example, text to speech functionality to convert textual data to a spoken message.

Figure 3:
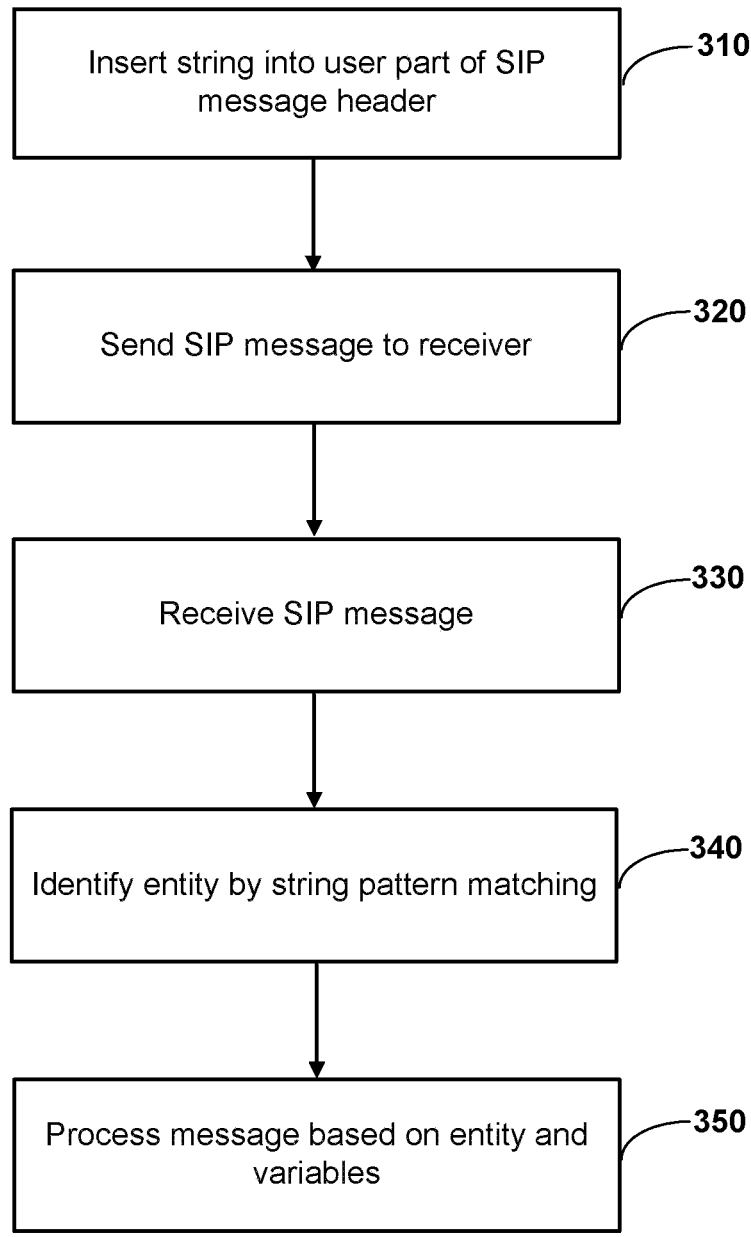
FIG. 3 illustrates additional methods according to one or more aspects of the present invention.

FIG. 3 is a flow chart illustrating methods according to embodiments of the invention.

Referring collectively to FIGS. 1 & 3, at step 310, an originator inserts a character string into the user part of a SIP message header. The originator may include softphone 150, for example softphone 150 of device 140. Alternatively the originator may include a gateway server, for example gateway 155, for translating a conventional telephone call into an IP telephony communication. The conversion may include, for example, constructing a SIP message including a SIP message header so that the gateway is the SIP UAC in this case. Gateway 155 may include processing for conducting a lookup based on the source of the call so as to identify the caller, and any stored pertinent information about the calling user. It may insert into the SIP message header, for example, a character string identifying the user and variables identifying characteristics of the user. The header used may be the "From" header in an embodiment.

The originator may then send the SIP message at step 320 to a receiver. The receiver may be an endpoint server, for example IVR system 120. Alternatively, the receiver may be a proxy server or similar routing server, for example servers 115a or 115b. The SIP message may pass through several servers en route to its destination. At step 330, a receiver receives the message. At step 340, a string pattern matching operation is conducted against SIP headers including user parts of URIs. Where a stored regular expression pattern is identified, the entity mapped to this is identified, and values of variables identified used to process the message at step 350.

The above-described embodiments relate to SIP messages. SIP is a text-based communications protocol which uses headers, including headers including URIs including a user part. It may be envisaged that other communications protocols derived from SIP, or successor protocols to it, which use headers in a similar way may employ embodiments of the present invention.

Those skilled in the art will note that, according to an embodiment of the present invention, there is provided a computer-implemented method for providing information to a user in an Internet telephony environment. The method includes receiving from the user a message including a Session Initiation Protocol (SIP) header, and identifying, by a string pattern matching operation, a stored regular expression pattern which matches a character string in a user part of the SIP message header. One portion of the character string identifies an application mapped to the stored pattern, and a further portion of the character string identifies one or more variables for use by the application. The method further includes identifying, by the application, information by applying the values of the one or more variables, and communicating the information to the user.

In one or more embodiments, the SIP message header may be the "To" header.

In one or more embodiments, the Internet telephony environment includes an Interactive Voice Response (IVR) system and the application is an IVR application.

According to an embodiment of the present invention, there is provided a computer-implemented method for communicating information in an Internet telephony environment. The method includes inserting in the user part of a Session Initiation Protocol (SIP) header of a SIP message a character string matchable to, by a string pattern matching operation, a stored regular expression pattern. One portion of the character string identifies an entity mapped to the stored pattern, and a further portion of the character string identifies one or more variables applicable to the entity. The values of the one or more variables are useable by a receiver of the message to process information relating to the entity. The method includes communicating the message to a message receiver.

According to an embodiment of the present invention, there is provided a computer-implemented method for processing information in an Internet telephony environment. The method includes receiving a message including a Session Initiation Protocol (SIP) header, and identifying, by a string pattern matching operation, a stored regular expression pattern which matches a character string in a user part of the SIP message header. One portion of the character string identifies an entity mapped to the stored pattern, and a further portion of the character string identifies one or more variables applicable to the entity. The method includes identifying information about the entity by applying the values of the one or more variables, and processing the message based on the information.

In one or more embodiments, the entity is an identifier of a user and the variables include information about the user.

In one or more embodiments, the SIP message header is the "From" header.

According to an embodiment of the present invention, there is provided an Internet telephony system for providing information to a user. The system includes a receiving component for receiving from the user a message comprising a Session Initiation Protocol (SIP) message header. A matching component is provided for identifying, by a string pattern matching operation, a stored regular expression pattern which matches a character string in a user part of the SIP message header. One portion of the character string identifies an application mapped to the stored pattern, and a further portion of the character string identifies one or more variables for use by the application. An application is provided for identifying information by applying the values of the one or more variables. A communicating component is provided for communicating the information to the user.

In one or more embodiments, the system includes an Interactive Voice Response (IVR) system, and the application is an IVR application.

According to an embodiment of the present invention, there is provided an Internet telephony system for communicating information in a Session Initiation Protocol (SIP) messaging environment. The system includes an inserting component for inserting in the user part of a SIP header of a SIP message a character string matchable to, by a string pattern matching operation, a stored regular expression pattern. One portion of the character string identifies an entity mapped to the stored pattern, and a further portion of the character string identifies one or more variables applicable to the entity. The values of the one or more variables are useable by a receiver of the message to process information relating to the entity. There is also provided a communicating component for communicating the message to a message receiver.

According to an embodiment of the present invention, there is provided an Internet telephony system for processing information in a Session Initiation Protocol (SIP) messaging environment. The system includes a receiving component for receiving a message comprising a Session Initiation Protocol (SIP) header. The system includes a matching component for identifying, by a string pattern matching operation, a stored regular expression pattern which matches a character string in a user part of the SIP message header. One portion of the character string identifies an entity mapped to the stored pattern, and a further portion of the character string identifies one or more variables applicable to the entity. There is also provided an identifying component for identifying information about the entity by applying the values of the one or more variables, and a processing component for processing the message based on the information.

According to an embodiment of the present invention, there is provided a computer program product for providing information to a user in an Internet telephony environment. The computer program product includes a computer readable storage medium having a computer readable program stored in it, and the computer readable program, when executed on a computing device, causes the computing device to: receive from the user a message comprising a Session Initiation Protocol, SIP, header; identify, by a string pattern matching operation, a stored regular expression pattern which matches a character string in a user part of the SIP message header, one portion of the character string identifying an application mapped to the stored pattern, and a further portion of the character string identifying one or more variables for use by the application; identify, by the application, information by applying the values of the one or more variables; and communicate the information to the user.

In one or more embodiments, the Internet telephony environment includes an Interactive Voice Response (IVR) system and the application is an IVR application.

According to an embodiment of the present invention, there is provided a computer program product for communicating information in an Internet telephony environment. The computer program product includes a computer readable storage medium having a computer readable program stored in it. The computer readable program, when executed on a computing device, causes the computing device to: insert in the user part of a Session Initiation Protocol, SIP, header of a SIP message a character string matchable to, by a string pattern matching operation, a stored regular expression pattern, one portion of the character string identifying an entity mapped to the stored pattern, and a further portion of the character string identifying one or more variables applicable to the entity, the values of the one or more variables being useable by a receiver of the message to process information relating to the entity; and communicate the message to a message receiver.

According to an embodiment of the present invention, there is provided a computer program product for processing information in an Internet telephony environment. The computer program product includes a computer readable storage medium having a computer readable program stored in it. The computer readable program, when executed on a computing device, causes the computing device to: receive a message comprising a Session Initiation Protocol, SIP, header; identify, by a string pattern matching operation, a stored regular expression pattern which matches a character string in a user part of the SIP message header, one portion of the character string identifying an entity mapped to the stored pattern, and a further portion of the character string identifying one or more variables applicable to the entity; identify information about the entity by applying the values of the one or more variables; and process the message based on the information.

Figure 4:
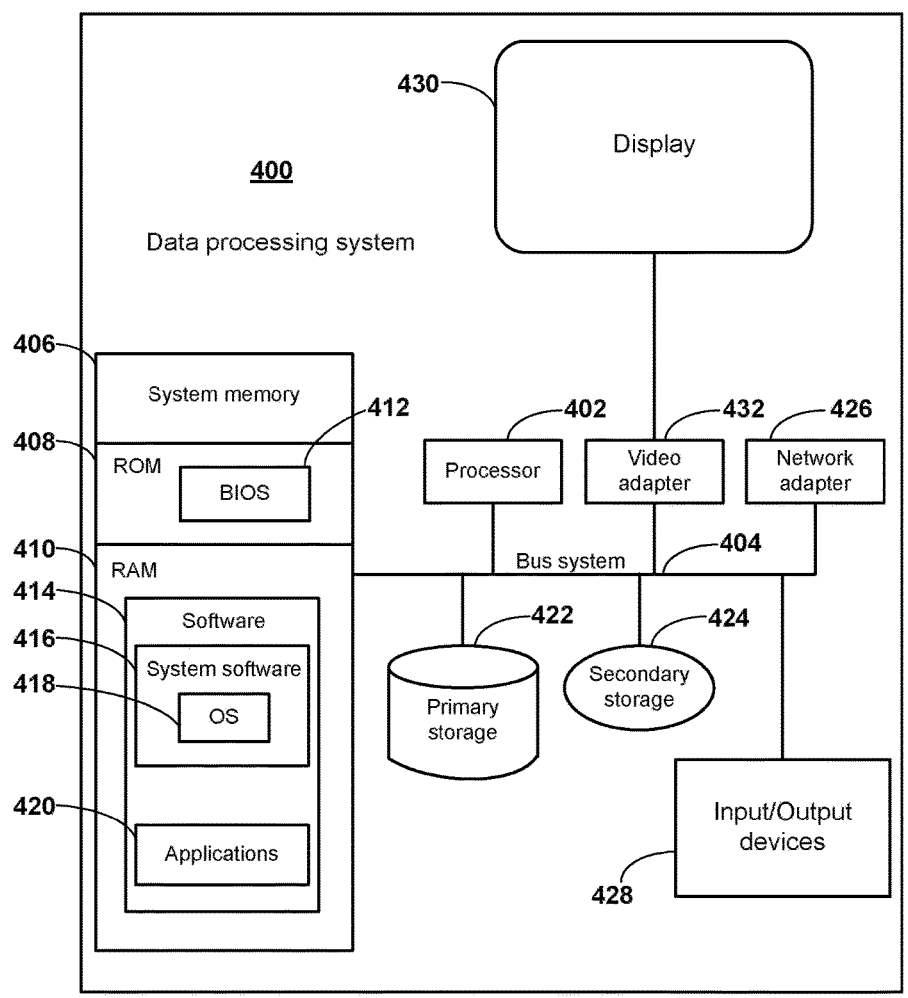
FIG. 4 illustrates a data processing system which may implement one or more aspects of the present invention.

FIG. 4 illustrates an exemplary system for implementing aspects of the present invention. Data processing system 400 operable for storing and/or executing program code includes at least one processor 402 coupled directly or indirectly to memory elements through a system bus 404. The memory elements may include local memory employed during actual execution of the program code, bulk storage memory, and cache memory for providing temporary storage of at least some program code in order to reduce the number of times program code must be retrieved from bulk storage during program execution.

Memory elements may include system memory 406 in the form of non-volatile read only memory (ROM) 408 and volatile random access memory (RAM) 410. A basic input/output system (BIOS) 412 may be stored in ROM 408. Software 414 may be stored in RAM 410. Software 414 may include system software 416, which may include operating system software 418, and software applications 420.

Memory elements may also include primary storage means 422 which may include a magnetic hard disc drive, and secondary storage means 424 which may include an optical disc drive or a magnetic disc drive. The primary and secondary storage means and their associated computer-readable storage media provide non-volatile storage of computer-executable instructions, data structures, program modules and other data for data processing system 400. Software applications may be stored on the primary and secondary storage means 422, 424 as well as in system memory 406.

Data processing system 400 may operate in a networked environment using logical connections to one or more remote data processing systems via network adapter 426.

Input/output (I/O) devices 428 may be coupled to the system either directly or through intervening I/O controllers. A user may enter commands and information into system 400 through input devices such as a keyboard, pointing device such as a mouse, or other input devices such as microphone, joystick, trackball, touchpad, game controller, satellite dish, scanner etc. Output devices may include printers, speakers etc. Display device 430 may also be connected to system bus 404 via an interface such as video adapter 432.

It will be clear to a person skilled in the art that many improvements and modifications can be made to the foregoing exemplary embodiments without departing from the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for communicating information in an Internet telephony environment, comprising:

inserting, by an intermediate entity between a call originator and a message receiver, in a user part of a Session Initiation Protocol (SIP) header of a SIP message, a character string matchable, by a string pattern matching operation, to a stored regular expression pattern, one portion of the character string identifying the call originator, the call originator being different from a sender of the SIP message, and a further portion of the character string identifying one or more variables applicable to the call originator, the values of the one or more variables being useable by the message receiver to process information relating to the call originator; and communicating the message to the message receiver.

2. The computer-implemented method as claimed in claim 1, wherein the call originator comprises a user, and the variables comprise information about the user.

3. The computer-implemented method as claimed in claim 1, wherein the SIP message header is a "From" header.

4. The computer-implemented method as claimed in claim 1, further comprising:
receiving the message comprising the SIP message header;
identifying the stored regular expression pattern which matches the character string in the user part of the SIP message header;
identifying information about the call originator identified in the one portion of the character string by applying the values of the one or more variables identified in the further portion of the character string; and
processing the message based on the information.

5. The computer-implemented method as claimed in claim 4, wherein the call originator comprises a user, and the variables comprise information about the user.

6. The computer-implemented method as claimed in claim 4, wherein the SIP message header is a "From" header.

7. An Internet telephony system for communicating information in an Internet telephony environment, the Internet telephony system comprising:
a memory; and
a processor communicatively coupled to the memory, wherein the Internet telephony system is configured to perform a method comprising:
inserting, by an intermediate entity between a call originator and a message receiver, in a user part of a Session Initiation Protocol (SIP) header of a SIP message, a character string matchable, by a string pattern matching operation, to a stored regular expression pattern, one portion of the character string identifying the call originator, the call originator being different from a sender of the SIP message, and a further portion of the character string identifying one or more variables applicable to the call originator, the values of the one or more variables being useable by the message receiver to process information relating to the call originator; and
communicating the message to the message receiver.

8. The Internet telephony system as claimed in claim 7, wherein the call originator comprises a user, and the variables comprise information about the user.

9. The Internet telephony system as claimed in claim 7, wherein the SIP message header is a "From" header.

10. The Internet telephony system as claimed in claim 7, wherein the method further comprises:
receiving the message comprising the SIP message header;
identifying the stored regular expression pattern which matches the character string in the user part of the SIP message header;
identifying information about the call originator identified in the one portion of the character string by applying the values of the one or more variables identified in the further portion of the character string; and
processing the message based on the information.

11. The Internet telephony system as claim in claim 10, wherein the call originator comprises a user, and the variables comprise information about the user.

12. The Internet telephony system as claim in claim 10, wherein the SIP message header is a "From" header.

13. A computer program product for communicating information in an Internet telephony environment, the computer program product comprising a computer readable storage medium having a computer-readable program code stored therein, wherein the computer readable program code, when executing on a computing device, causes the computing device to perform a method comprising:
inserting, by an intermediate entity between a call originator and a message receiver, in a user part of a Session Initiation Protocol (SIP) header of a SIP message, a character string matchable, by a string pattern matching operation, to a stored regular expression pattern, one portion of the character string identifying the call originator, the call originator being different from a sender of the SIP message, and a further portion of the character string identifying one or more variables applicable to the call originator, the values of the one or more variables being useable by the message receiver to process information relating to the entity; and
communicating the message to the message receiver.

14. The computer program product as claimed in claim 13, wherein the call originator comprises a user, and the variables comprise information about the user.

15. The computer program product as claimed in claim 13, wherein the SIP message header is a "From" header.

16. The computer program product as claimed in claim 13, wherein the method further comprises:
receiving the message comprising the SIP message header;
identifying the stored regular expression pattern which matches the character string in the user part of the SIP message header;
identifying information about the call originator identified in the one portion of the character string by applying the values of the one or more variables identified in the further portion of the character string; and
processing the message based on the information.

17. The computer program product of claim 16, wherein the call originator comprises a user, and the variables comprise information about the user.

18. The computer program product of claim 16, wherein the SIP message header is a "From" header.

* * * * *